Dec. 11, 1945.   A. E. YOUNG   2,390,908
SLIP CLUTCH
Filed May 1, 1943
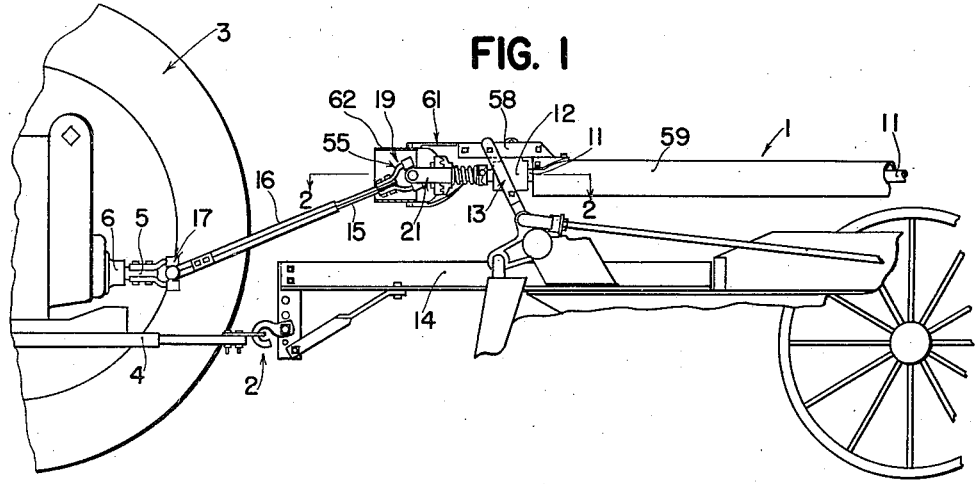
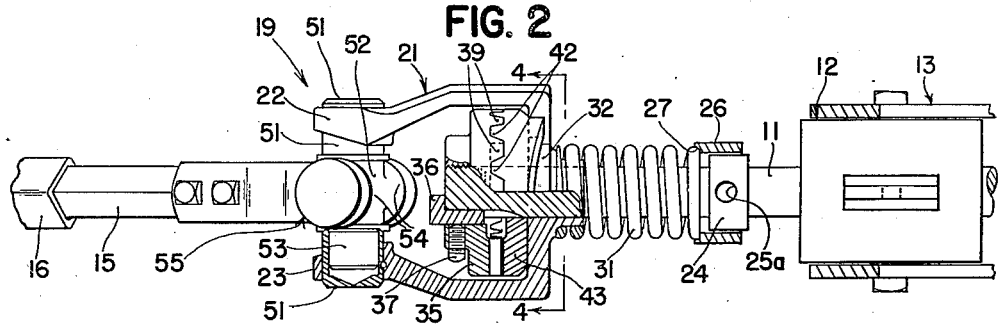
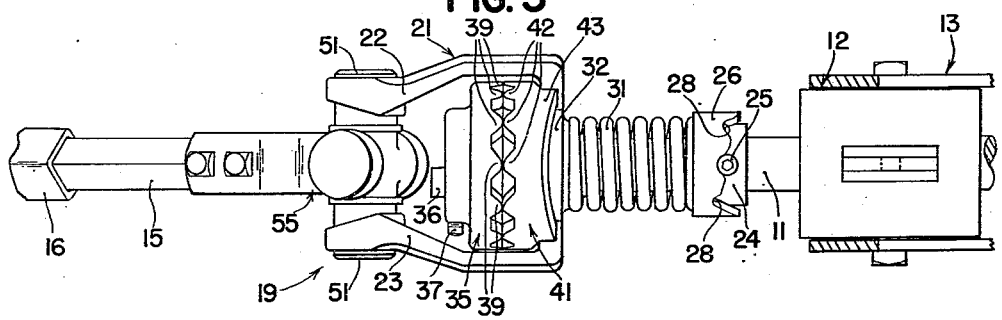
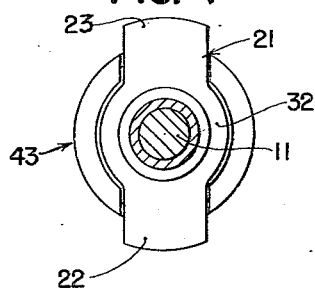
INVENTOR.
AUSTIN E. YOUNG
BY
ATTORNEYS Patented Dec. 11, 1945

2,390,908

UNITED STATES PATENT OFFICE 2,390,908

SLIP CLUTCH

Austin E. Young, Syracuse, N. Y., assignor to Syracuse Chilled Plow Co., Inc., Syracuse, N. Y., a corporation of New York Application May 1, 1943, Serial No. 485,569

2 Claims. (Cl. 64—29)

The present invention relates generally to agricultural implements and more particularly to slip clutches employed to take care of abnormal overloads and prevent damage to parts of the implement.

The object and general nature of the present invention is the provision of a new and improved slip clutch construction in which a number of parts are reduced and the construction made both simple and inexpensive. More particularly, it is a feature of this invention to provide a combined universal joint and slip clutch and a construction embodying a slip clutch and universal joint combined with a pair of telescopic shaft sections, whereby by virtue of the telescopic association, the necessary axial movement of the slip clutch is accommodated without additional or extraneous parts. It is also a feature of this invention to provide a slip clutch and telescopic shaft construction so arranged that the telescopic association of the shaft sections accommodates in a simple and efficient manner the necessary axial movement to provide for engagement and disengagement of the slip clutch in operation.

These and other objects and advantages of the present invention will be apparent to those skilled in the art after a consideration of the following detailed description, taken in conjunction with the accompanying drawing.

In the drawing:

Figure 1 is a view of a portion of the drive for a potato digger, in which the principles of the present invention have been incorporated;

Figure 2 is a generally longitudinal sectional view taken through the slip clutch and associated parts;

Figure 3 is a view similar to Figure 2, showing the parts in the positions they occupy when the slip clutch is disengaged, as by an overload.

Figure 4 is a sectional view taken along the line 4—4 of Figure 2.

Referring now to the drawing, the potato digger is indicated in its entirety by the reference numeral 1 and is hitched, by suitable hitch means 2, to a farm tractor 3 which is of conventional construction, embodying a drawbar 4 to which the hitch 2 is connected and a power take-off shaft 5 supported on the tractor through a suitable bearing structure indicated at 6. The potato digger 1 is similar to the potato digger shown in United States Patent 2,172,435, issued September 12, 1939, to Curtiss L. Cook, to which reference may be made if necessary.

Briefly, the potato digger 1 includes digging and/or lifting mechanism driven by a drive shaft 11 which, at its forward end, is supported by bearing means 12 on a bracket 13 carried by the frame 14 of the potato digger. The rear end of the shaft 11 is connected to drive a jackshaft (not shown) carried by and forming a part of the potato digger 1, as shown in the above-mentioned Cook patent.

A pair of telescopic shaft sections 15 and 16, the latter slidably receiving the former, are disposed rearwardly of the power take-off shaft 5 and connected with the latter through a universal joint 17 of conventional construction. The rear end of the telescopic shaft section 16 is connected by a universal joint 19 with a slip clutch yoke member 21 having arm sections 22 and 23.

The forward end of the shaft 11, forward of the bearing support 12 therefor, is provided with an abutment collar 24 which is held in place on the shaft 11 by a pair of set screws 25 screwed through threaded openings 25a in the collar 24 and preferably but not necessarily, into openings formed in the shaft 11. An adjusting sleeve 26 is disposed about the collar 24 and at one side has a spring receiving seat 27 and at the other side a plurality of pairs of notches 28 which receive the heads of the set screws 25, as shown in Figure 3. A spring 31 is disposed about the forward end of the shaft 11, forward of the collar 26 and bears at its rear end against the seat 27. At its forward end, the spring 31 bears against the central portion 32 of the slip clutch yoke 21, this portion being mounted on and encircling the forward end of the shaft 11. At its forward end the shaft 11 receives a clutch disk 35 which is fixed to the forward end of the shaft 11 by any suitable means, such as a key 36 and a set screw 37, whereby the disk 35 serves as a rigid part of the shaft 11. The disk 35 is provided with serrations or slip clutch teeth 39. A second clutch disk 41 is provided with companion slip clutch teeth or serrations 42 and has a slotted hub 43 which is formed to embrace the central portion 32 of the yoke 21, whereby the clutch disk 41 is connected with and serves as a part of the yoke 21. The angle of the slip clutch teeth 39, 42 is such that, under overload conditions, the teeth become separated (see Figure 3), due to the axially rearward movement of the yoke 21 against the action of the spring 31, whereby the drive is interrupted.

The extended arm sections 22 and 23 of the yoke 21 are carried forwardly a sufficient distance to clear the clutch disk 35 in either of its positions, and each arm extension is formed to receive a hollow bushing 51. A universal joint spider 52 is provided with trunnions 53 journaled in said bushings 51, the spider 52 including other trunnions 54 receiving a second yoke member 55 forming a part of the universal joint 19. The yoke 55 is connected to the rear end of the telescopic shaft section 15.

The bracket 13 is arranged to support not only the bearing 12, but also a longitudinally extending bar 58 which, at its rear end, supports the forward end of a guard tube 59 disposed about the driven shaft 11. The forward end of the bar 58 supports a yoke 61 to which is pivoted a guard sleeve 62 which encircles and protects the slip clutch and associated parts.

By virtue of employing the telescopic shaft sections the axial movement of one of the telescopic shaft sections, together with the interconnected universal joint, easily and inexpensively accommodates the necessary axial displacement of the slip clutch yoke 21 when the slip clutch functions to prevent the transmission of power under overload conditions. In other words, the present slip clutch involves a considerably smaller number of parts than prior art slip clutches in which provision had to be made in the slip clutch itself for the necessary axial movement of the parts necessary to permit the slip clutch to function.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A combined slip joint and universal joint for connecting two shafts, a slip clutch disk fixed to one end of one shaft in non-rotatable relation and having angled tooth faces, a universal joint yoke having an apertured central section embracing said one shaft at the side of said clutch disk opposite the end of the shaft to which said clutch disk is secured, said yoke having arms embracing said clutch disk and a companion slip clutch disk also having angled faces cooperating with said first slip clutch disk, means establishing a driving connection between said companion slip clutch disk and said yoke, a universal joint spider pivoted about one axis to the other shaft and pivoted about another axis to said arms adjacent the end of said one shaft and said first clutch disk, the other shaft comprising telescopic sections, a spring disposed about said one shaft outside said yoke and bearing at one end against the latter, and abutment means on said one shaft spaced axially from said yoke and receiving the reaction of said spring, said yoke moving along said one shaft toward said abutment means when one of said clutch disks slips relative to the other, as under an overload.

2. A combined slip joint and universal joint for connecting two shafts, a slip clutch disk fixed to one end of one shaft in non-rotatable relation and having angled tooth faces, a universal joint yoke having an apertured central section embracing said one shaft at the side of said clutch disk opposite the end of the shaft to which said clutch disk is secured, said yoke having arms embracing said clutch disk and a companion slip clutch disk also having angled faces cooperating with said first slip clutch disk, means establishing a driving connection between said companion slip clutch disk and said yoke, a universal joint spider pivoted about one axis to the other shaft and pivoted about another axis to said arms adjacent the end of said one shaft and said first clutch disk, a spring disposed about said one shaft outside said yoke and bearing at one end against the latter, and abutment means on said one shaft spaced axially from said yoke and receiving the reaction of said spring, said yoke moving along said one shaft toward said abutment means when one of said clutch disks slips relative to the other, as under an overload.

AUSTIN E. YOUNG.